(12) United States Patent
Manabe et al.

(10) Patent No.: US 12,473,408 B2
(45) Date of Patent: *Nov. 18, 2025

(54) BIAXIALLY ORIENTED POLYESTER FILM

(71) Applicant: TOYOBO CO., LTD., Osaka (JP)

(72) Inventors: Nobuyuki Manabe, Inuyama (JP); Masayuki Haruta, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 716 days.

This patent is subject to a terminal disclaimer.

(21) Appl. No.: 17/627,096

(22) PCT Filed: Jun. 23, 2020

(86) PCT No.: PCT/JP2020/024621

§ 371 (c)(1),
(2) Date: Jan. 13, 2022

(87) PCT Pub. No.: WO2021/019965

PCT Pub. Date: Feb. 4, 2021

(65) Prior Publication Data

US 2022/0251314 A1  Aug. 11, 2022

(30) Foreign Application Priority Data

Jul. 31, 2019  (JP) .................................. 2019-140553

(51) Int. Cl.
*C08J 5/18* (2006.01)

(52) U.S. Cl.
CPC ............. *C08J 5/18* (2013.01); *C08J 2367/02* (2013.01)

(58) Field of Classification Search
CPC ........................................................ C08J 5/18

(Continued)

(56) References Cited

U.S. PATENT DOCUMENTS

| 4,761,327 A | 8/1988 | Hamano et al. |
| 6,025,056 A * | 2/2000 | Machii .................... B32B 27/08 428/458 |

(Continued)

FOREIGN PATENT DOCUMENTS

| CN | 106142794 A | * 11/2016 |
| EP | 1066960 A2 | 1/2001 |

(Continued)

OTHER PUBLICATIONS

Machine_English_translation_CN_106142794_A; Peng, c.; preparation method of biaxially oriented polyester film for electronics tapes; Nov. 23, 2016; EPO; whole document (Year: 2024).*

(Continued)

*Primary Examiner* — Tahseen Khan
(74) *Attorney, Agent, or Firm* — Leydig, Voit & Mayer, Ltd.

(57) ABSTRACT

Disclosed is a biaxially oriented polyester film that is superior in transparency and easy to perform secondary processing such as coating and vapor deposition, and satisfies performance after the secondary processing. The biaxially oriented polyester film consists of a polyester resin composition including particles, and at least one surface of the film satisfies all of the following requirements (1) to (3): (1) the number of micro protrusions having a height of less than 3 nm per an area of $4\times10^{-12}$ $m^2$ of 250 or more and 600 or less; (2) the number of micro protrusions having a height of 3 nm or more per an area of $4\times10^{-12}$ $m^2$ of 300 or more and 600 or less; and (3) an arithmetic average height Sa of 0.010 μm or more and 0.025 μm or less.

6 Claims, 1 Drawing Sheet

(58) Field of Classification Search
USPC .......................................................... 428/141
See application file for complete search history.

(56) References Cited

U.S. PATENT DOCUMENTS

| | | | |
|---|---|---|---|
| 6,291,053 | B1 | 9/2001 | Peiffer et al. |
| 7,208,565 | B1 | 4/2007 | Nakajima et al. |
| 2004/0058805 | A1 | 3/2004 | Nakajima et al. |
| 2013/0344345 | A1 | 12/2013 | Sakellarides et al. |
| 2017/0151746 | A1 | 6/2017 | Klein et al. |
| 2022/0024111 | A1 | 1/2022 | Nakano et al. |
| 2022/0056223 | A1 | 2/2022 | Haruta et al. |
| 2022/0126495 | A1 | 4/2022 | Haruta et al. |
| 2022/0251314 | A1* | 8/2022 | Manabe .................. B32B 27/08 |
| 2023/0001619 | A1 | 1/2023 | Manabe et al. |
| 2024/0101770 | A1 | 3/2024 | Manabe et al. |
| 2024/0124705 | A1 | 4/2024 | Manabe et al. |

FOREIGN PATENT DOCUMENTS

| | | | | |
|---|---|---|---|---|
| EP | 1273428 | A1 | | 1/2003 |
| EP | 0807517 | B1 | | 11/2006 |
| JP | 10119172 | A | * | 5/1998 |
| JP | H10-119172 | A | | 5/1998 |
| JP | H11-010725 | A | | 1/1999 |
| JP | 2002-249565 | A | | 9/2002 |
| JP | 2002-249602 | A | | 9/2002 |
| JP | 2002370277 | A | * | 12/2002 |
| JP | 3461175 | B2 | | 10/2003 |
| JP | 3506236 | B2 | | 3/2004 |
| JP | 4834923 | B2 | | 12/2011 |
| JP | 2012-097163 | A | | 5/2012 |
| JP | 2014-065282 | A | | 4/2014 |
| JP | 2017-100446 | A | | 6/2017 |
| KR | 10-2015-0072380 | A | | 6/2015 |
| MY | 165588 | A | | 4/2018 |
| WO | WO-2016080342 | A1 | * | 5/2016 ............ B29C 55/02 |
| WO | WO 2020/031197 | A1 | | 2/2020 |
| WO | WO 2020/095725 | A1 | | 5/2020 |
| WO | WO 2020/166353 | A1 | | 8/2020 |
| WO | WO 2020/170819 | A1 | | 8/2020 |
| WO | WO 2020/195742 | A1 | | 10/2020 |
| WO | WO 2020/203105 | A1 | | 10/2020 |
| WO | WO 2021/019965 | A1 | | 2/2021 |
| WO | WO 2021/117736 | A1 | | 6/2021 |
| WO | WO 2022/168702 | A1 | | 8/2022 |
| WO | WO 2022/168703 | A1 | | 8/2022 |

OTHER PUBLICATIONS

Machine_English_translation_WO_2016080342_A1; Aida, Laminated Film; Aug. 31, 2017; EPO; whole document (Year: 2024).*
Machine_English_translation_JP_2002370277_A; Hiraoka, Vapor Depositing Polyester Film and Vapor Deposited Polyester film; Dec. 24, 2002; EPO; whole document (Year: 2024).*
Machine_English_translation_JP_10119172_A; Kataoka, Vapor Deposited Biaxially Oriented Polyester Film; May 12, 1998; EPO; whole document (Year: 2024).*
China National Intellectual Property Administration, Second Office Action in Chinese Patent Application No. 202080054406.1 (Jul. 14, 2023).
European Patent Office, Extended European Search Report in European Patent Application No. 20847260.5 (Jul. 11, 2023).
Intellectual Property India, Examination Report in Indian Patent Application No. 202247003030 (Sep. 12, 2023).
Japan Patent Office, Office Action in Japanese Patent Application No. 2021-536834 (Apr. 2, 2024).
China National Intellectual Property Adminsitration, First Office Action in Chinese Patent Application No. 202080054406.1 (Feb. 16, 2023).
Japanese Patent Office, International Search Report in International Patent Application No. PCT/JP2020/024621 (Aug. 25, 2020).
Taiwan Intellectual Property Office, Office Action in Taiwanese Patent Application No. 109121024 (Jun. 19, 2024).
European Patent Office, Extended European Search Report in European Patent Application No. 20898153.0 (Dec. 11, 2023).
European Patent Office, Extended European Search Report in European Patent Application No. 22749576.9 (Nov. 28, 2024).
European Patent Office, Extended European Search Report in European Patent Application No. 22749577.7 (Dec. 3, 2024).
Japan Patent Office, International Search Report in International Application No. PCT/JP2020/045721 (Mar. 16, 2021).
Japan Patent Office, International Search Report in International Patent Application No. PCT/JP2022/002851 (Mar. 15, 2022).
Japan Patent Office, International Search Report in International Patent Application No. PCT/JP2022/002852 (Mar. 15, 2022).
The International Bureau of WIPO, International Preliminary Report on Patentability in International Patent Application No. PCT/JP2022/002851 (Aug. 3, 2023).
The International Bureau of WIPO, International Preliminary Report on Patentability in International Patent Application No. PCT/JP2022/002852 (Aug. 3, 2023).
Korean Intellectual Property Office, Office Action in Korean Patent Application No. 10-2022-7002644 (Jul. 14, 2025).

* cited by examiner

BIAXIALLY ORIENTED POLYESTER FILM

TECHNICAL FIELD

The present invention relates to a biaxially oriented polyester film, and specifically, a biaxially oriented polyester film suitable for secondary processing such as coating and vapor deposition that improve functions of the biaxially oriented polyester film.

BACKGROUND ART

Conventionally, biaxially oriented polyester films have been widely used for various fields such as packaging materials and industrial materials thanks to its superiority in mechanical strength, thermal properties, and optical properties. Biaxially oriented polyester films have superior oxygen barrier performance, however, for the purpose of packaging of contents such as common foods, retort foods, and drugs, demands for its design and oxygen barrier performance and water vapor barrier performance relating to transubstantiation and deterioration of the contents have been growing, and transubstantiation and deterioration of the contents have become a problem.

Therefore, for the biaxially oriented polyester films used for the purpose of packaging of contents such as common foods, retort foods, and drugs, measures have been taken that improve adhesiveness between the films and printing ink and that improve barrier properties for gases such as oxygen and water vapor.

For example, measures improving gas barrier performance includes a measure in which a film made of resin having good gas barrier performance such as polyvinylidene chloride and polyethylene vinyl alcohol copolymer is laminated with the biaxially oriented polyester film, a measure in which a solution of these resins is coated on the film to laminate a thin layer, and a measure in which a metal such as aluminum or a metal oxide such as aluminum oxide is vapor-deposited on the film to form a thin layer on the film.

Especially, vapor-deposited polyester films having metal oxide on the film surface have been widely used thanks to its superiority in heat resistance and transparency as well as gas barrier performance.

However, industrially stably obtaining vapor-deposited polyester film having a thin layer of metal oxide such as silicon oxide and aluminum oxide, which has good gas barrier performance, has not been easy.

Therefore, gas barrier performance of vapor-deposited polyester film has been tried to be improved by controlling surface conditions of a biaxially oriented polyester film used as a substrate of the vapor-deposited polyester film, and a biaxially oriented polyester film having prescribed center plane surface roughness and a prescribed number of protrusions (for example, see Patent document 1), and a biaxially oriented polyester film having prescribed center line surface roughness (for example, see Patent document 2) have been proposed.

Furthermore, a biaxially oriented polyester film having a prescribed number of micro protrusions having a certain height or higher has been proposed (for example, see Patent document 3).

The conditions of these films were controlled only focusing on improving gas barrier performance after forming a metal oxide thin layer, and therefore, they were insufficient in reducing wrinkles generated in a film roll that was formed by winding the obtained film and insufficient in reducing blocking, that is adhesion of films in a film roll. Moreover, they only have insufficient performance after secondary processing such as coating or vapor deposition.

RELATED ART DOCUMENT

Patent Document

Patent document 1: JPH10-119172 A
Patent document 2: JPH11-010725 A
Patent document 3: JP4834923 B

SUMMARY OF THE INVENTION

Problems to be Solved by the Invention

The objective of the present invention is to improve the above problems of the conventional technology, and provide a biaxially oriented polyester film that is superior in transparency and easy to perform secondary processing such as printing, coating, and vapor deposition, and is superior in performance after the secondary processing.

Means for Solving the Problems

The present inventors investigated the reason for deteriorated characteristics after the secondary processing, and has found that since a biaxially oriented polyester film has electrical insulating properties, static marks, which are parts that is partially charged by peeling or contacting with a conveyer roll in a film producing process or secondary processing process, and static mark discharge traces resulting from discharging of built-up static electricity etc. are easily generated, and that it is difficult for coated melt resin or vapor deposited molecules of inorganic oxides to form a uniform thin layer without deficits on these areas of the film.

As a result of further intensive studies, the present inventors have found that a prescribed number or more of micro protrusions having a prescribed height or lower on the surface on which a coating layer or a vapor deposited layer is formed can prevent or reduce the generation of the above-mentioned discharge traces and static marks, which are parts locally strongly charged, and improve performance such as gas barrier performance after secondary processing. Furthermore, the present inventors have found that a prescribed range of the number and the shape of micro protrusions having a prescribed height or higher can improve slipperiness between films, and a prescribed range of arithmetic average height of the film surface can make it unlikely for transparency to be decreased.

The present invention is as follows:
1. A biaxially oriented polyester film consisting of a polyester resin composition including particles, wherein at least one surface of the film satisfies all of the following requirements (1) to (3):
   (1) the number of micro protrusions having a height of less than 3 nm per an area of $4 \times 10^{-12}$ m$^2$ of 250 or more and 600 or less;
   (2) the number of micro protrusions having a height of 3 nm or more per an area of $4 \times 10^{-12}$ m$^2$ of 300 or more and 600 or less;
   (3) an arithmetic average height Sa of 0.010 µm or more and 0.025 µm or less.
2. The biaxially oriented polyester film according to 1, wherein a kinetic friction coefficient between a surface satisfying all of the requirements (1) to (3) and the opposite surface is 0.20 or more and 0.60 or less.

3. The biaxially oriented polyester film according to 1. or 2, wherein a surface satisfying all of the requirements (1) to (3) has a wet tension of 50 mN/m or more.

4. The biaxially oriented polyester film according to any one of 1. to 3, having an external haze of 1.8% or less and an internal haze of 2.0% or less.

Effects of the Invention

The present invention can provide a biaxially oriented polyester film that is superior in transparency, and makes it possible for wrinkles to be less likely to be generated in a film roll when the produced film is wound up into the film roll. At the same time, secondary processing such as coating and vapor deposition can be easily performed to the film because the film surfaces of a film roll are less likely to stick to each other (that is, blocking phenomena), and the film has superior properties after secondary processing.

Especially, in recent years, in order to improve productive efficiency of a biaxially oriented polyester film, the length of a biaxially oriented polyester film roll wound up just after a stretching process (hereinafter, referred to as a master roll) has been made longer. Even when producing such a large size of film roll, the biaxially oriented polyester film of the present invention satisfies reduced wrinkles and blocking, and suitable for secondary processing and satisfies properties after secondary processing, one example of which is barrier properties of a vapor deposited film.

The same can be said for film rolls that are formed by slitting a master roll into a smaller sizes.

MODE FOR CARRYING OUT THE INVENTION

Figure 1:
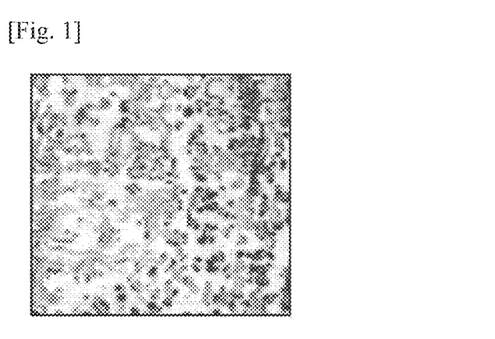
FIG. 1 is a photograph of a strongly charged part of a film surface drawn from a film roll under the condition where the part is visualized with toner for judgement of charge distribution. Static marks are observed.
Figure 2:
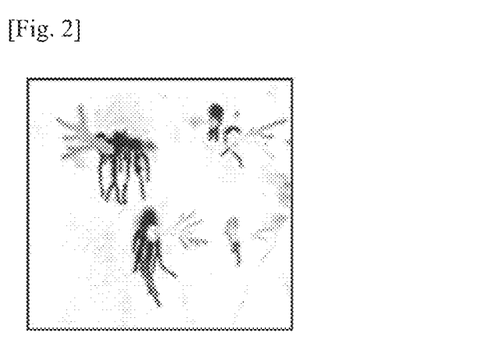
FIG. 2 is a photograph of a part having discharge traces on a film surface drawn from a film roll under the condition where the part is visualized with toner for judgement of charge distribution. Static mark discharge traces are observed.
Figure 3:
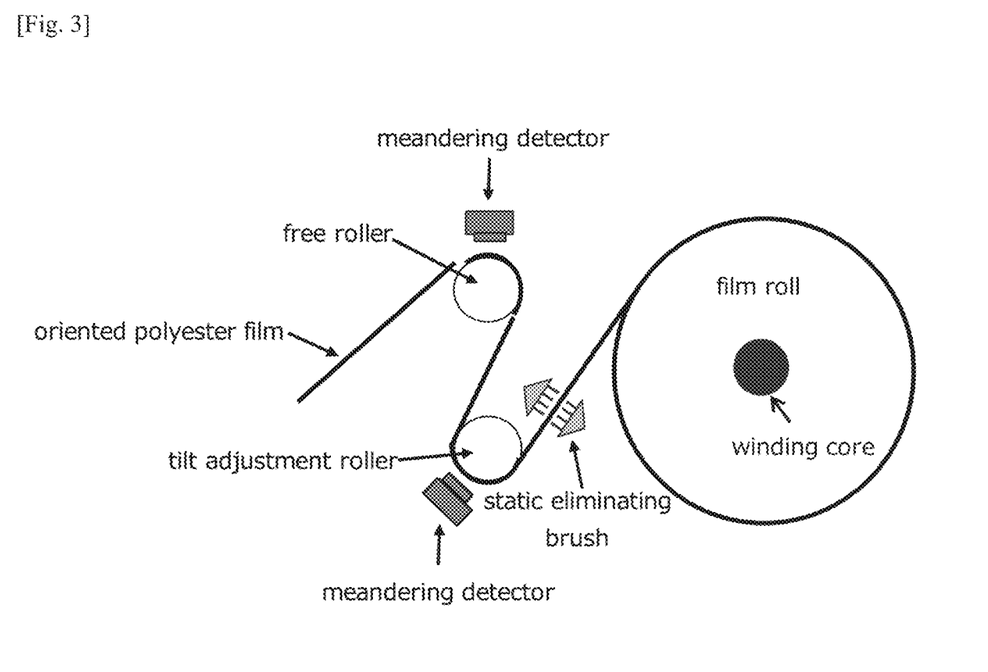
FIG. 3 is a schematic layout of a biaxially oriented polyester film in the process of winding up, film rolls, neutralization brushes, and meandering prevention devices.

Hereinafter, the present invention will be specifically described.
[Polyester Resin Composition]
A biaxially oriented polyester film of the present invention consists of a polyester resin composition including the following polyester resin as a main component.

The polyester resin constituting the biaxially oriented polyester film of the present invention is polymers synthesized from dicarboxylic acids or ester-forming derivatives thereof and diols or ester-forming derivatives thereof. For example, the polymers are exemplified by polyethylene terephthalate, polybutylene terephthalate, polyethylene-2,6-naphthalate, and preferably polyethylene terephthalate in view of mechanical properties, heat resistance, cost, and the like.

The main component here means that the content ratio of the main component in the polyester resin composition is 80% by weight or more, and more preferably 90% by weight or more, even more preferably 95% by weight or more, and most preferably 98% by weight or more.

Other components may be included in the polyester resin within a range that does not hinder the purpose of the present invention. Specifically, copolymerized components, as a dicarboxylic acid component, can be exemplified by isophthalic acid, naphthalenedicarboxylic acid, 4,4-diphenyldicarboxylic acids, adipic acid, sebacic acid, and ester-forming derivatives thereof; copolymerized components, as a diol component, can be exemplified by diethylene glycol, hexamethylene glycol, neopentyl glycol, cyclohexanedimethanol. In addition, copolymerized components can be also exemplified by polyoxyalkylene glycol such as polyethyleneglycol and polypropyleneglycol. The amount of copolymerization per repeating constituent unit is preferably 10% by mole or less, more preferably 5% by mole or less, and most preferably 3% by mole or less.

A process for producing the polyester resin constituting the biaxially oriented polyester film of the present invention may be exemplified by a process in which the aforementioned dicarboxylic acid or ester-forming derivatives thereof, and diol or ester-forming derivatives thereof are used as main starting materials, and in accordance with the common procedure, the starting materials are esterified or transesterified, followed by condensation polymerization at a high temperature under a reduced pressure.

The polyester resin constituting the biaxially oriented polyester film of the present invention preferably has a limiting viscosity of 0.50 to 0.90 dl/g, and more preferably 0.55 to 0.80 dl/g from the viewpoint of film-forming productivity and suitability for recycling.

To make it possible for at least one surface of the biaxially oriented polyester film to satisfy all of the following requirements (1) to (3), at least one kind of particles selected from the group consisting of inorganic particles, organic particles, and mixture thereof is preferably included in the polyester resin composition of the present invention:

(1) the number of micro protrusions having a height of less than 3 nm per an area of $4\times10^{-12}$ m² of 250 or more and 600 or less;
(2) the number of micro protrusions having a height of 3 nm or more per an area of $4\times10^{-12}$ m² of 300 or more and 600 or less; and
(3) an arithmetic average height Sa of 0.010 μm or more and 0.025 μm or less.

The inorganic particles can be exemplified by silica (silicon oxide), alumina (aluminum oxide), titanium dioxide, calcium carbonate, kaolin, and barium sulfate.

The organic particles can be exemplified by, for example, acrylic-based resin particles, melamine resin particles, silicone resin particles, and particles consisting of cross-linked polystyrene. Of those, particles consisting of silica (silicon oxide), calcium carbonate, or alumina (aluminum oxide), or particles consisting of polymethacrylate, polymethylacrylate, or derivatives thereof are preferable, and more preferably particles consisting of silica (silicon oxide) or calcium carbonate, and especially preferably particles consisting of silica (silicon oxide).

Particle size distribution of the particles used in the present invention is preferably monodisperse.

While the shape of the inorganic fine particles is not particularly limited, a more spherical shape can increase the number of micro protrusions having a height of less than 3 nm without substantial change in the number of micro protrusions having a height of 3 nm or more and the arithmetic average height Sa.

The particles of the present invention preferably have a weight average particle diameter measured by a coulter counter of 0.8 to 1.8 µm.

A weight average particle diameter of the particles of 0.8 µm or more makes it easier for the number of micro protrusions having a height of less than 3 nm and the arithmetic average height Sa to be not less than the lower limit in the above (1) and (3).

A weight average particle diameter of the particles of 1.8 µm or less makes it easier for the arithmetic average height Sa to be not greater than the upper limit in the above (3), and suitable for the number of micro protrusions having a height of less than 3 nm to be not less than the lower limit in the above (1).

The lower limit of the content of the particles in the polyester resin composition of the present invention is preferably 1000 ppm by weight, more preferably 1300 ppm by weight, and particularly preferably 1400 ppm by weight.

A content of the particles of 1000 ppm by weight or more makes it easier for the number of micro protrusions having a height of less than 3 nm and the number of micro protrusions having height of 3 nm or more to be not less than the lower limit in the above (1) and (2).

The upper limit of the content of the particles is preferably 3000 ppm by weight, more preferably 2500 ppm by weight, even more preferably 2200 ppm by weight, and particularly preferably 1800 ppm by weight.

A content of the particles of 3000 ppm by weight or less makes it easier for the number of micro protrusions having a height of less than 3 nm, the number of micro protrusions having a height of 3 nm or more, and the arithmetic average height Sa to be not greater than the upper limit of the requirements (1), (2), and (3).

As a process for adding the particles into the polyester resin composition of the present invention, for example, the particles are added at any time such as in the stage of esterification for producing polyester resin, after transesterification reaction, or before the start of condensation polymerization. The particles are preferably dispersed in ethylene glycol etc. to become a slurry and added, and then condensation polymerization is preferably performed.

In addition, a process of blending a slurry of the particles dispersed in ethylene glycol or water etc. and the polyester resin material using a kneading extruder with a bent, and a process of blending dried particles and the polyester resin material using a kneading extruder are also preferable.

In the process of blending the particles and the polyester resin material, while fewer aggregates of the particles are preferable in order to stably obtain an intended surface condition, controlling conditions of a producing process of the biaxially oriented polyester film after the blending process can reduce its effect.

Furthermore, within a range that does not hinder the purpose of the present invention, the polyester resin composition may include a small amount of another polymers and additives such as an antioxidant, a thermal stabilizer, an antistatic material, an ultraviolet absorber, a plasticizer, a pigment, and others.

[Process for Producing the Biaxially Oriented Polyester Film]

The biaxially oriented polyester film of the present invention can be obtained, for example, by melt extruding the polyester resin composition having the above-mentioned polyester resin as a main component using an extruder to form an unstretched sheet, and stretching the unstretched sheet.

Favorable example will be described below, however, the present invention is not limited thereto.

The biaxially oriented polyester film of the present invention may have a single-layered structure or a laminated structure of two-layered, three-layered, four-layered, or more.

In the case of the laminated structure of two-layered or more, each layer consists of the polyester resin composition as described above, however, the polyester resin composition constituting each of adjacent layers is preferably different in the kind of constituent and the content amount of constituent from each other. In the case of a two-layered structure, given that the polyester resin composition constituting each layer is referred to as A, B, respectively, the two-layered structure may have a structure of A/A or A/B, for example.

In the case of the laminated structure of three-layered or more, each layer also consists of the above-mentioned polyester resin composition, however, the polyester resin composition constituting each of adjacent layers is preferably different in the kind of constituent and the content amount of constituent from each other.

In the case of a three-layered structure, given that the polyester resin composition constituting each layer is referred to as A, A', B, C, respectively, the three-layered structure may have a structure of A/B/C, A/B/A, or A/B/A', for example. However, if the properties of the both surfaces need not to be particularly changed, the structure of A/B/A in which the both surfaces have the same composition is preferable because it can be easily manufactured. Note that A, A', B, C have different composition from each other.

A three-layered structure is preferable because even though a middle layer does not include particles, the surface roughness of the film can be controlled by controlling the content of the particles included only in surface layers, so that the content of the particles in the entire film can be reduced.

This also has an advantage of prevention of aroma tightness from deteriorating, while aroma components otherwise evaporate through voids formed at boundaries of the inorganic particles and the polyester resin.

In addition, it is advantageous in terms of produce cost, because it becomes easy for recovered raw materials from edge parts that are produced in film producing processes and recycled materials from other film producing processes to be appropriately mixed to the middle layer within a range that does not adversely affect the properties of the film surfaces.

When the polyester resin composition is melt extruded, the polyester resin composition is preferably dried using a vacuum dryer, or dryers such as a hopper dryer and a paddle dryer. After drying the polyester resin composition in such a manner, the polyester resin composition is melt and extruded into a film shape at a temperature that is higher than a melting point of the polyester resin and in the range of 200 to 300° C. Alternatively, the polyester resin, the particles, and, if necessary, additives, may be fed through extruders separately, and then mixed and melt extruded into a sheet shape.

A process for extruding the melt resin composition may include any available method such as a T-die method and a tubular method.

Subsequently, the extruded melt polyester resin composition in a sheet shape is rapidly cooled to obtain an unstretched sheet. As a method for rapidly cooling the melt polyester resin composition, a method is preferably adopted in which the melt polyester resin composition is cast on a rotating drum through a nozzle and rapidly cooled and solidified to obtain a substantially unoriented resin composition sheet. The temperature of the rotating drum is preferably set at 40° C. or lower.

Then, the obtained unstretched sheet is treated in the following processes, which is a combination of stretching in a longitudinal direction and a width direction, heat fixing, heat relaxing, and the like to obtain the biaxially oriented polyester film of the present invention.

Hereinafter, the processes are specifically described. The longitudinal direction means a direction in which the unstretched sheet runs, and the width direction means a direction perpendicular to the longitudinal direction.

As a stretching method, both a simultaneous biaxially stretching in which the longitudinal direction and the width direction are stretched simultaneously, and a sequential biaxially stretching in which either the longitudinal direction or the width direction is stretched first are available, and the sequential biaxially stretching is the most preferred method because of its high film forming speed and high productivity, as well as excellent thickness uniformity of the finally obtained biaxially oriented polyester film.

The film forming speed here means the running speed (m/min) of the biaxially oriented polyester film when it is wound onto a master roll after the stretching process.

A temperature at which the unstretched sheet is stretched in the longitudinal direction is preferably in the range of (Tg+15) to (Tg+55°)° C., using the glass transition temperature of the polyester resin (hereinafter, referred to as Tg) as an index, and a stretching ratio is preferably in the range of 4.2 to 4.7 times.

When a temperature at the time of stretching is (Tg+55°)° C. or lower and a stretching ratio is 4.2 times or more, it is preferable because it is easier to make the number of micro protrusions having a height of less than 3 nm not less than the lower limit in the above (1), the balance of molecular orientation in the longitudinal direction and the width direction is good, and the difference in physical properties between the longitudinal direction and the width direction is small.

On the other hand, a temperature at the time of stretching in the longitudinal direction of (Tg+15)° C. or higher and a stretching ratio of 4.7 times or less makes it easier to make the arithmetic average height Sa not greater than the upper limit in the above (3). It is desirable because the tensile stress (bowing phenomenon) generated in the direction opposite to the running direction of the film in the thermal relaxation process does not become too large.

Furthermore, at the time of stretching in the longitudinal direction, a method of stretching in two stages, three stages, or four stages between multiple rolls, instead of stretching in a single stage, is desirable, because the difference in physical properties in the width direction of the film can be further reduced by increasing the stretching ratio in the longitudinal direction without increasing the stretching speed so much. From the viewpoint of effectiveness, equipment, and cost, two-stage stretching or three-stage stretching is preferred.

The film obtained by stretching the unstretched sheet in the longitudinal direction may be subjected to surface treatment such as corona treatment or plasma treatment as necessary, and then, a resin dispersion solution or resin dissolution solution may be applied to at least one side of the film to impart functions such as smoothness, easy adhesion, and antistatic properties.

In a case where the film obtained by stretching the unstretched sheet in the longitudinal direction is stretched in the width direction, the film can be stretched in the width direction by leading it to a tenter device, gripping both ends of the film obtained by stretching the unstretched sheet in the longitudinal direction with clips, heating the film to a predetermined temperature with hot air, and then widening the distance between the clips while transporting the film in the longitudinal direction.

A temperature at the time of stretching in the width direction of (Tg+5°)° C. or higher is preferable because it is easier to keep the arithmetic average height not greater than the upper limit in the above (3), and the film becomes less likely to break during stretching.

A temperature at the time of stretching of (Tg+40°)° C. or lower is preferable because it is easier to make the number of micro protrusions having a height of less than 3 nm not less than the lower limit in the above (1), and it is also easier to perform uniform stretching in the width direction, which prevents thickness variation in the width direction, and thus prevents variations in winding hardness in the width direction on the film roll surface from becoming large.

(Tg+8°)° C. or higher and (Tg+37°)° C. or lower is more preferable, and even more preferably (Tg+11°)° C. or higher and (Tg+34°)° C. or lower.

A stretching ratio in the width direction of the film obtained by stretching the unstretched sheet in the longitudinal direction is preferably 4.0 times or more and 6 times or less.

A stretching ratio in the width direction of 4.0 times or more is preferable because it is easier to make the number of micro protrusions having a height of less than 3 nm not less than the lower limit in the above (1), and it is also easier to obtain a high yield in terms of material balance, mechanical strength does not decrease, thickness variation in the width direction is less likely to become large, and variations in winding hardness in the width direction of the film roll is unlikely to occur. A stretching ratio in the width direction of 4.1 times or more is more preferable, and even more preferably 4.2 times or more.

A stretching ratio in the width direction of 6 times or less is preferable because it is easier to make the arithmetic average height Sa not greater than the upper limit in the above (3), and the film is less likely to break during film stretching.

The heat fixing process is performed following the stretching process in the width direction, and the heat fixing temperature of the film obtained by stretching the unstretched sheet in the longitudinal direction and then stretching it in the width direction is preferably 240° C. or higher and 250° C. or lower.

A heat fixing temperature of 240° C. or higher is preferable because it is easier to make the number of micro protrusions having a height of less than 3 nm not less than the lower limit in the above (1), and the heat shrinkage ratio in both the longitudinal direction and the width direction does not become too high, resulting in better thermal dimensional stability during vapor deposition processing.

A heat fixing temperature of 250° C. or lower is preferable because bowing is less likely to increase.

In addition, the heat relaxing process is performed, which may be performed after the heat fixing process separately from the heat fixing process, or may be performed simultaneously with the heat fixing process. The relaxing rate in the film width direction in the heat relaxing process is preferably 4% or more and 8% or less.

A relaxing rate of 4% or more is preferable because the heat shrinkage ratio in the width direction of the obtained biaxially stretched polyester film does not become too high, and dimensional stability during vapor deposition processing becomes good.

A relaxing rate of 8% or less is preferable because the tensile stress (bowing phenomenon) of a center part in the film width direction generated in the direction opposite to the film running direction does not become too large, and the film thickness variation rate in the width direction does not became large.

In the heat relaxing process, until the film obtained by stretching the unstretched sheet in the longitudinal direction and then stretching it in the width direction shrinks by heat relaxation, the film may relax under its own weight because of reduced restraining force in the width direction, or the film may distend due to accompanying airflow of the hot air blown from the nozzles installed above and below the film, so that the film is in a situation where it can fluctuate very easily up and down, resulting in large fluctuation in the orientation angle and diagonal heat shrinkage difference of the obtained biaxially stretched polyester film.

One way to reduce these problems is, for example, to keep the film horizontally by adjusting the air velocity of the hot air blown from the nozzles installed above and below the film.

The biaxially oriented polyester film for vapor deposition of the present invention may be subjected to corona discharge treatment, glow discharge treatment, flame treatment, and surface roughening treatment, and may be subjected to known anchor coat treatment, printing, and decoration, within a range that does not hinder the purpose of the present invention.

(Properties of the Biaxially Oriented Polyester Film)

At least one surface of the biaxially oriented polyester film of the present invention preferably satisfies all of the following (1) to (3):

(1) the number of micro protrusions having a height of less than 3 nm per an area of $4\times10^{-12}$ m$^2$ of 250 or more and 600 or less;

(2) the number of micro protrusions having a height of 3 nm or more per an area of $4\times10^{-12}$ m$^2$ of 300 or more and 600 or less; and (3) an arithmetic average height Sa of 0.010 μm or more and 0.025 μm or less.

Each will be specifically described.

(1) Number of Micro Protrusions Having a Height of Less than 3 nm Per an Area of $4\times10^{-12}$ m$^2$ Since biaxially oriented polyester film is electrically insulating, it is prone to static marks, which are partially charged areas caused by contact with transport rolls and peeling during the film manufacturing and processing process, and static mark discharge traces, which are caused by the discharge of stored static electricity. However, if the number of micro protrusions having a height of less than 3 nm per an area of $4\times10^{-12}$ m$^2$ is 250 or more, static marks and static mark discharge traces are reduced, and thus, coating spots are less likely occur after the coating layer is formed, the gas barrier performance of the formed inorganic thin film layer is improved, and it is easier to improve the performance after secondary processing.

The reason for this is considered that if the number of micro protrusions having a height of less than 3 nm per an area of $4\times10^{-12}$ m$^2$ is 250 or more, even when the film and metal rolls come into contact with a strong force and the high protrusions on the film surface are pushed in during the process of transporting or winding the manufactured film, the area of contact between the film surface and the metal rolls is extremely small, so that the amount of charge due to friction becomes small, resulting in reduced static marks and static mark discharge traces. The number is more preferably 300 or more, even more preferably 400 or more, and particularly preferably 500 or more. This trend can also apply to the case of friction caused by contact between films.

While the number of micro protrusions having a height of less than 3 nm does not improve slipperiness of the film or reduce its blocking properties, it is characteristic that it does not have an adverse effect on the gas barrier properties of the inorganic thin film layer formed on the film surface.

When the number of micro protrusions having a height of less than 3 nm is 600 or less, the number of static marks and static mark discharge traces are also sufficiently small.

(2) Number of Micro Protrusions Having a Height of 3 nm or More Per an Area of $4\times10^{-12}$ m$^2$ The number of micro protrusions having a height of 3 nm or more of 300 or more is preferable because the kinetic friction coefficient between the films is unlikely to become too low, and it can make it more difficult to generate static marks, which are partially charged areas caused by contact with transport rolls and peeling during the film manufacturing and processing process due to electrical insulation properties of the biaxially oriented polyester film, and static mark discharge traces, which are caused by the discharge of stored static electricity. The number is more preferably 400 or more, even more preferably 500 or more.

When the number of micro protrusions having a height of 3 nm or more is 600 or less, the gas barrier performance of the formed inorganic thin film layer can be sufficiently obtained.

(3) Arithmetic Average Height Sa

An arithmetic average height Sa of 0.010 μm or more is preferable because it prevents adhesion (blocking phenomenon) between the films and between the recesses around the protrusions formed on the film surface of the film rolls, and allows smooth secondary processing of the film. Sa is more preferably 0.013 μm or more, even more preferably 0.017 μm or more, and particularly preferably 0.020 μm or more.

An arithmetic average height Sa of 0.025 μm or less is preferable because the haze, especially the external haze, of the biaxially oriented polyester film is reduced, which leads to excellent transparency. Sa is more preferably 0.023 μm or less, and even more preferably 0.020 μm or less.

The arithmetic average height Sa of the other film surface is preferably in the same range.

(Kinetic Friction Coefficient)

The kinetic friction coefficient between one surface of the biaxially oriented polyester film of the present invention and the opposite surface is preferably 0.20 or more and 0.60 or less.

When the kinetic friction coefficient is 0.20 or more, the films do not slide too much on each other, and when the film roll is wound with a winder device during film production or slitting, the film roll is less likely to wrinkle and the secondary processability is less likely to deteriorate. It is more preferably 0.30 or more, and most preferably 0.35 or more.

When the kinetic friction coefficient is 0.60 or less, the films slide over each other, so that when the film roll is wound with a winder device during film production or slitting, the film roll is less likely to be miswound and the secondary processability is less likely to deteriorate. It is more preferably 0.50 or less, and most preferably 0.44 or less.

(Static Friction Coefficient)

The static friction coefficient between one surface of the biaxially oriented polyester film of the present invention and the opposite surface is preferably 0.20 or more and 0.60 or less.

When the static friction coefficient is 0.20 or more, the films do not slide too much on each other, and when the film roll is wound with a winder device during film production or slitting, the film roll is less likely to wrinkle and the secondary processability is less likely to deteriorate. It is more preferably 0.30 or more, and most preferably 0.35 or more.

When the static friction coefficient is 0.60 or less, the films slide over each other, so that when the film roll is wound with a winder device during film production or slitting, the film roll is less likely to be miswound and the secondary processability is less likely to deteriorate. It is more preferably 0.50 or less, particularly preferably 0.44 or less, and most preferably 0.40 or less.

(Maximum Height Sz)

The surface satisfying all the above (1) to (3) of the biaxially oriented polyester film of the present invention preferably has a maximum height Sz of 0.5 μm or more and 2.0 μm or less.

When the maximum height Sz is 0.5 μm or more, the amount of air entrained between films that come into contact with each other when winding the master roll or when slitting the master roll and winding the biaxially oriented polyester film on the winding core is less likely to increase, resulting in less stretching and deformation of the film. In addition, the film in the roll is less likely to sag after the air in the film roll is removed. With the particles contained in the polyester resin having a weight average particle diameter of 0.8 μm or more, it is easy to make the maximum height Sz 0.5 μm or more.

When the maximum height Sz is 2.0 μm or less, it is easy to reduce the loss or defects of the coating layer or inorganic thin film layer after secondary processing on the surface of the biaxially oriented polyester film. With a temperature when stretching in the longitudinal direction of (Tg+40°)° C. or lower, or with a stretching ratio of 4.2 time or more, it is easy to make the maximum height Sz 2.0 μm or less.

The same applies to the maximum height Sz on the other film surface.

(External Haze)

The biaxially oriented polyester film of the present invention preferably has an external haze of 1.8% or less. An external haze of 1.8% or less is preferable because it is less likely to impair the smoothness of the film surface, less likely to cause charging due to contact with or separation from the transport rolls in the film manufacturing process, and less likely to cause quality defects due to charging such as static marks and static mark discharge traces. The external haze is more preferably 1.6% or less, even more preferably 1.4% or less, particularly preferably 1.2% or less, and most preferably 1.0% or less.

(Internal Haze)

The biaxially oriented polyester film of the present invention preferably has an internal haze of 2.5% or less. An internal haze of 2.5% or less is preferable because transparency is less likely to deteriorate. The internal haze is more preferably 2.0% or less, even more preferably 1.8% or less, and particularly preferably 1.6% or less.

(Wet Tension)

One surface of the biaxially oriented polyester film of the present invention may be surface modified by surface treatment such as low-temperature plasma treatment and corona discharge treatment.

At this time, a surface satisfying all of the above (1) to (3) of the biaxially oriented polyester film of the present invention preferably has a wet tension of 50 mN/m or more, and more preferably 52 mN/m or more.

There is not a particular upper limit, however, even a range of 55 mN/m or less is sufficient for performance after secondary processing of coating or vapor-deposited thin films is applied.

(Film Thickness)

The biaxially oriented polyester film of the present invention preferably has a film thickness of 5 to 40 μm. A thickness of 5 μm or more does not degrade the strength and firmness of the film and prevents wrinkles from forming on the film roll when it is wound with a winder device. On the other hand, with a film thickness in the range of 40 μm or less, strength and firmness can be sufficiently obtained, and it is preferable to make the film thinner from the viewpoint of cost. The film thickness is more preferably 8 to 30 μm, and particularly preferably 9 to 20 μm.

(Vapor-Deposited Film)

A gas barrier layer, such as an inorganic thin film layer or a metal foil such as aluminum foil, may be provided on at least one surface satisfying all of the following (1) to (3) of the biaxially oriented polyester film:

(1) the number of micro protrusions having a height of less than 3 nm per an area of $4\times10^{-12}$ m$^2$ of 250 or more and 600 or less;

(2) the number of micro protrusions having a height of 3 nm or more per an area of $4\times10^{-12}$ m$^2$ of 300 or more and 600 or less; and (3) an arithmetic average height Sa of 0.010 μm or more and 0.025 μm or less.

The inorganic thin film layer is a thin film consisting of metals or inorganic oxides. There are no particular restrictions on the material used to form the inorganic thin film layers as long as it can be made into a thin film, however, from the viewpoint of gas barrier properties, inorganic oxides such as silicon oxide (silica), aluminum oxide (alumina), and mixtures of silicon oxide and aluminum oxide are preferable. In particular, a complex oxide of silicon oxide and aluminum oxide is preferred from the viewpoint of both flexibility and densification of the thin film layer and transparency.

A mixing ratio of silicon oxide and aluminum oxide in a complex oxide of silicon oxide and aluminum oxide is preferably in the range of 20 to 70% Al by weight of the metal content. If the Al concentration is less than 20%, the water vapor gas barrier performance may become low. On the other hand, if the Al concentration is more than 70%, the inorganic thin film layer tends to become hard, and the film may be destroyed during secondary processing such as printing or lamination, resulting in lower gas barrier performance. Note that silicon oxide here refers to various silicon oxides, such as SiO and $SiO_2$, or mixtures thereof, and aluminum oxide here refers to various aluminum oxides, such as AlO and $Al_2O_3$, or mixtures thereof.

The thickness of the inorganic thin film layer is usually 1 to 100 nm, and preferably 5 to 50 nm. If the thickness of the inorganic thin film layer is less than 1 nm, it may be difficult to obtain satisfactory gas barrier performance; on the other hand, if the thickness of the inorganic thin film layer is excessively thicker than 100 nm, there will be no corresponding improvement in gas barrier performance, and it will be disadvantageous in terms of bending resistance and manufacturing cost.

There are no particular restrictions on the method for forming the inorganic thin film layer, and for example, the method may be appropriately selected from known vapor deposition methods including chemical vapor deposition (CVD) methods and physical vapor deposition (PVD) methods such as vacuum deposition, sputtering, and ion plating.

A typical method for forming an inorganic thin film layer is described below, using a silicon oxide-aluminum oxide-based thin film as an example. For example, when the vacuum evaporation method is employed, a mixture of $SiO_2$ and $Al_2O_3$ or a mixture of $SiO_2$ and Al is preferably used as the evaporation material. Particles are usually used as the evaporation material, and it is desirable for the size of each particle to be large enough not to change the pressure during evaporation, and the particle size is preferably 1 mm to 5 mm. For heating, methods such as resistance heating, high-frequency induction heating, electron beam heating, and laser heating can be employed. Reactive vapor deposition can also be employed in which reaction gas such as oxygen, nitrogen, hydrogen, argon, carbon dioxide, and water vapor is introduced, or means such as ozone addition and ion assist is employed. Furthermore, the film forming conditions can be changed as desired, such as applying a bias to the material that is to be vapor evaporated (a laminate film used for vapor evaporation), heating or cooling the material that is to be vapor evaporated. Such conditions as evaporation materials, reaction gases, bias of the material that is to be vapor evaporated, and heating or cooling of the material that is to be vapor evaporated can be changed in the same way when the sputtering method or the CVD method is employed. In addition, a printing layer may be stacked on the above inorganic thin film layer.

In the present invention, a protective layer is preferably provided on top of the gas barrier layer. The gas barrier layer consisting of metal oxides is not a completely dense film but is dotted with minute defective portions. By coating the metal oxide layer with a particular resin composition for the protective layer described below to form the protective layer, the resin in the resin composition for the protective layer can penetrate the defective portions of the metal oxide layer, resulting in the stabilization of the gas barrier performance. In addition, using a material with gas barrier properties in the protective layer itself will greatly improve the gas barrier performance of the laminated film.

The protective layer can be a resin such as urethane-based resin, polyester-based resin, acrylic-based resin, titanium-based resin, isocyanate-based resin, imine-based resin, and polybutadiene-based resin to which a curing agent such as epoxy-based agent, isocyanate-based agent, and melamine-based agent is added. Solvents (thinners) used in forming the protective layer include, for example, aromatic solvents such as benzene and toluene; alcoholic solvents such as methanol and ethanol; ketone-based solvents such as acetone and methyl ethyl ketone; ester-based solvents such as ethyl acetate and butyl acetate; and polyhydric alcohol derivatives such as ethylene glycol monomethyl ether.

The aforementioned urethane resin is preferable because the polar groups of the urethane bond interact with the inorganic thin film layer and also the urethan resin has flexibility due to the presence of an amorphous portion, which reduces damage to the inorganic thin film layer even when subjected to bending loads.

The acid value of the urethane resin is preferably in the range of 10 to 60 mgKOH/g, more preferably in the range of 15 to 55 mgKOH/g, and even more preferably in the range of 20 to 50 mgKOH/g. When the acid value of the urethane resin is within the above range, the liquid stability is improved when it is made into an aqueous dispersion, and the protective layer can be uniformly deposited on a highly polar inorganic thin film, resulting in a good coating appearance.

The aforementioned urethan resin preferably has a glass transition temperature (Tg) of 80° C. or higher, and more preferably 90° C. or higher. Tg of 80° C. or higher can reduce swelling of the protective layer due to molecular motion during the wet heat treatment process (temperature rise-temperature hold-temperature fall).

For the aforementioned urethan resin, it is more preferable to use a urethane resin that contains aromatic or aromatic-aliphatic diisocyanate components as its main constituent in terms of improving gas barrier performance.

Among them, it is particularly preferable to contain meta-xylene diisocyanate component. By using the above resin, the cohesive force of the urethan bonds can be further enhanced due to the stacking effect of the aromatic rings, resulting in good gas barrier performance.

In the present invention, the proportion of aromatic or aromatic aliphatic diisocyanate in the urethane resin is preferably in the range of 50% by mole or more (50 to 100% by mole) of 100% by mole of the polyisocyanate component (F). The proportion of the total amount of aromatic or aromatic-aliphatic diisocyanate is preferably 60 to 100% by mole, more preferably 70 to 100% by mole, and even more preferably 80 to 100% by mole. As such a resin, "TAKE-LAC (registered trademark) WPB" series commercially available from Mitsui Chemicals, Inc. can be suitably used. If the proportion of the total amount of aromatic or aromatic-aliphatic diisocyanate is less than 50% by mole, good gas barrier performance may not be obtained.

The urethane resin preferably has a carboxylic acid group (carboxyl group) from the viewpoint of improving the affinity with the inorganic thin film layer. In order to introduce a carboxylic acid (salt) group into the urethane resin, for example, a polyol compound having a carboxylic acid group such as dimethylolpropionic acid and dimethylolbutanoic acid can be introduced as a polyol component of a copolymer component. Furthermore, by neutralizing the synthesized urethane resin containing carboxylic acid groups by a salt-forming agent, an aqueous dispersion of the urethane resin can be obtained. Specific examples of the salt-forming agent include ammonia; trialkyl amines such as trimethylamine, triethylamine, triisopropylamine, tri-n-propylamine, and tri-n-butylamine; N-alkyl morpholines such as N-methylmorpholine and N-ethylmorpholine; and N-dialkyl alkanolamine such as N-dimethyl ethanolamine and N-diethyl ethanolamine. These may be used alone, or two or more may be used in combination.

(Laminate)

The biaxially oriented polyester film of the present invention may be laminated as a base film with a layer of other materials to form a laminate. This can be done by laminating the biaxially oriented polyester film after it is made or during film production.

For example, the biaxially oriented polyester film of the present invention, or the biaxially oriented polyester film of the present invention to which the inorganic vapor deposition layer is provided can be used as a packaging material by further forming a heat-sealable resin layer called a sealant.

The formation of the heat-sealable resin layer is usually done by extrusion lamination or dry lamination methods.

Any thermoplastic polymer for forming the heat-sealable resin layer is available that can sufficiently exhibit sealant adhesiveness, and exemplified by polyethylene resins such as HDPE, LDPE, and LLDPE; polypropylene resins; ethylene-vinyl acetate copolymers; ethylene-α-olefin random copolymers; and ionomer resins.

The sealant layer may be a single layer film or a multi-layer film, which can be selected according to the required function. For example, in terms of imparting moisture resistance, a multilayer film interleaved with a resin such as ethylene-cyclic olefin copolymer and polymethylpentene can be used. The sealant layer also may be blended with various additives such as flame retardants, slip agents, anti-blocking agents, antioxidants, light stabilizers, and adhesion agents.

The thickness of the sealant layer is preferably 10 to 100 μm, and more preferably 20 to 60 μm.

The layer structure of the laminate for packaging materials using the biaxially oriented polyester film of the present invention as the base film exemplified by base film/gas barrier layer/protective layer, base film/gas barrier layer/protective layer/adhesive layer/sealant layer, base film/gas barrier layer/protective layer/adhesive layer/resin layer/adhesive layer/sealant layer, base film/adhesive layer/resin layer/gas barrier layer/protective layer/adhesive layer/sealant layer, base film/gas barrier layer/protective layer/printing layer/adhesive layer/sealant layer, base film/printing layer/gas barrier layer/protective layer/adhesive layer/sealant layer, base film/gas barrier layer/protective layer/adhesive layer/resin layer/printing layer/adhesive layer/sealant layer, base film/adhesive layer/resin layer/printing layer/gas barrier layer/protective layer/adhesive layer/sealant layer, base film/printing layer/gas barrier layer/protective layer/adhesive layer/resin layer/adhesive layer/sealant layer, base film/printing layer/adhesive layer/resin layer/gas barrier layer/protective layer/adhesive layer/sealant layer, and base film/adhesive layer/resin layer/gas barrier layer/protective layer/printing layer/adhesive layer/sealant layer.

Laminates using the biaxially oriented polyester film of the present invention can be suitably used for packaging products, various label materials, lidding materials, sheet molded products, laminated tubes, and other applications. In particular, it is used for packaging bags (for example, pillow pouches, standing pouches, and four-sided pouches). The thickness of the laminate can be determined according to its application. For example, it is used in the form of a film or sheet with a thickness of 5 to 500 μm, preferably 10 to 300 μm.

EXAMPLES

Hereinafter, the present invention will be described in more detail, however, the present invention is not limited by embodiments of the examples, and can be changed as necessary without departing from the purpose of the present invention.

A. Evaluation method of polyester resin is as follows.
[Glass Transition Temperature (Tg)]
Using a differential scanning calorimetry analyzer (DSC 6220 manufactured by SII NanoTechnology Inc.), 5 mg of resin sample was melted to 280° C. under a nitrogen atmosphere, held for 5 minutes, quenched with liquid nitrogen, and measured at a temperature rise rate of 20° C./min from room temperature.
[Intrinsic Viscosity (IV)]
In 50 ml of a mixed solvent of phenol/1,1,2,2-tetrachloroethane (60/40 by weight ratio), 0.2 g of polyester resin was dissolved, and measured at 30° C. using an Ostwald viscometer. The unit was dl/g.

B. Evaluation method of polyester film is as follows.
[Film Thickness]
The film thickness was measured using a dial gauge in accordance with JIS K7130-1999 A method.
[External Haze, Internal Haze, and Total Haze]
An area of 5 cm in the longitudinal direction×5 cm in the transverse direction was cut out from the obtained film, and the total haze was measured in accordance with JIS-K7136 for all wavelengths of visible light at 25° C. using a turbidity meter (NDH5000) manufactured by Nippon Denshoku Industries Co., Ltd.

In the same manner, measured were the haze of a laminate consisting of only Zedel oil sandwiched between two quarts glass plates (hereinafter, "haze H1"), and the haze of a laminate consisting of polyester film with its surface uniformly wetted with Zedel oil sandwiched between two quarts glass plates (hereinafter, "haze H2").

Subsequently, the internal haze was obtained according to the following equation.

$$\text{Internal haze} = \text{haze}(H2) - \text{haze}(H1) \qquad \text{Equation 1}$$

The external haze shall be the value obtained by subtracting the internal haze from the total haze.

Note that all of the total haze, the internal haze, and the external haze are haze for all wavelengths of visible light.
[Arithmetic Average Height Roughness Sa, and Maximum Height Sz]
An area of 10 cm in the longitudinal direction×10 cm in the transverse direction was cut out from the obtained film, and the arithmetic average height (μm) and maximum height (μm) were measured by scanning with a white laser interferometer (NEW VIEW8300) manufactured by Zygo under the following observation conditions. The measurement was performed on the surface excluding unmelted materials and foreign substances such as dust.

Measurements was taken at 10 arbitrary points on the 10 cm×10 cm sample, and the average values were determined to be the arithmetic average height Sa and the maximum height Sz, respectively.
(Observation Conditions)
  Objective lens: 10×
  Zoom lens: 1×
  Field of view: 0.82×0.82 mm
  Sampling interval: 0.803 μm
  Assumed measurement time: 4 seconds
  Type: Surface
  Mode: CSI
  Z resolution: High
  Scan length: 20 μm
  Camera mode: 1024×1024 @100 Hz
  Shutter speed: 100%
  Light intensity: 1.3%
  Option: SureScan Off
  SmartPsi Averages 4
  Noise reduction
  Signal processing option: Fringe order analysis Advanced
  Fringe removal ON
[Kinetic Friction Coefficient and Static Friction Coefficient]
An area of 400 mm in the longitudinal direction×100 mm in the width direction was cut out from the obtained film to produce a sample film. This was aged for 12 hours under an atmosphere of 23° C. and 65% RH, and then divided into test pieces of 300 mm in the longitudinal direction×100 mm in the transverse direction for a test table and 100 mm in the longitudinal direction×100 mm in the width direction for a sliding piece.

The test piece for the test table was set on the test table, and the test piece for the sliding piece was attached with double-sided tape to the bottom surface of a metal sliding piece with a load of 1.5 kg (area size of 39.7 mm$^2$, square shape) so that each of the surfaces that had been in contact with the casting drum faced each other.

The sliding speed of the test piece was 200 mm/min, under the conditions of 23° C. and 65% RH, and the rest conditions were in accordance with JIS-7125, and the kinetic friction coefficient and static friction coefficient were measured respectively, and the average of the three measurement was used.

[Number of Micro Protrusions Per an Area of $4\times10^{-12}$ m$^2$ on the Film Surface]

An area of 10 mm in the longitudinal direction×10 mm in the width direction was cut out from the obtained film, and the measurement was performed using a scanning probe microscope (SPM-9700) manufactured by Shimadzu Corporation under the following observation conditions, and the image of the measured surface was captured.

The obtained images (height traces) were subjected to image processing under the following conditions.

Using the particle analysis software of the SPM-9700 series, the number of particles of 3 nm or more and the number of particles of less than 3 nm were counted within an area of $4\times10^{-12}$ m$^2$ (2 µm×2 µm square) with the threshold of particles that were to be extracted set at 3 nm under the following particle analysis conditions.

The measurements were taken five times at different locations, and the average of the three times, excluding the one with the highest count and the one with the lowest count, was calculated and used as the number of micro protrusions.

(Observation Conditions)
  Cantilever: made of Si (silicon)
  Scanning mode: Phase mode
  Scanning speed: 2 Hz
  Scanning range: 2 µm
  Number of pixels: 256×256
  Offset X: 0 µm
  Offset Y: 0 µm
  Scanning angle: 0°
  Operating point: 1.0 V
  P gain: 0.001
  I gain: 1500
  Offset Z: 0 µm
  Z range: ×2
  Scanning mode: Force constant
(Image Processing)
  Tilt correction: Average value in X direction (X), Average value in Y direction (Y), Line fit (L)
  Removal of noise lines: mode (range specification), automatic selection
(Particle Analysis)
  Target shape: particle
  XY threshold: 30%
  Number of pixels to ignore: 5

[Friction-Charged Electrostatic Potential]

An area of 80 mm in the longitudinal direction×50 mm in the width direction was cut out from the obtained film to produce a sample film. The sample film was aged for 16 hours under an atmosphere of 23° C. and 50% RH. The friction-charged electrostatic potential was measured using a friction-charged electrostatic potential measuring instrument (RST-300a) manufactured by Daiei Kagaku Seiki Mfg. Co., Ltd.

The sample film was fixed to the rotating device, and the static electricity generated by friction with the metal plate was measured at a drum rotation speed of 400 rpm for 60 seconds, and the maximum value was used as the friction-charged electrostatic potential. The sample film was evaluated based on the measured friction-charged electrostatic potential according to the following criteria.

Excellent: friction-charged electrostatic potential of less than 200 V
  Good: friction-charged electrostatic potential of 200 V or more and less than 500 V
  Fair: friction-charged electrostatic potential of 500 V or more and less than 1000 V
  Bad: friction-charged electrostatic potential of 1000 V or more

[Static Mark Evaluation]

The obtained biaxially oriented polyester film roll that had been wound at 550 mm in the width direction and 500 m in the longitudinal direction was rewound using a slitter (FN105E type) manufactured by Nishimura Mfg. Co., Ltd. at a speed of 15 m/min and a rewinding tension of 100 N/m (unit tension setting).

For electrostatic removal, the electrostatic removal device attached to the slitter was turned on, and electrostatic removal was performed by placing a static eliminating brush (NSP-2S manufactured by Achilles Corporation) between the unwinding roll and the tilt adjustment roller on the top and bottom sides of the film.

The film was unwound from the film edge on the top surface of the obtained film roll, and after removing 2 m from the film edge, the film was sampled at a length of 10 cm of the center part in the width direction and 10 cm in the longitudinal direction, and the charging state of the film surface was visualized using toner for judgement of charge distribution manufactured by Kasuga Denki Inc. The charging state of the film roll was evaluated according to the following criteria.

Excellent: No static marks, no static mark discharge traces, and no toner adhesion.
  Good: no static marks, no static mark discharge traces, but toner is adhered.
  Bad: Static marks and static mark discharge traces are observed.

[Wet Tension]

An area of 400 mm in the longitudinal direction×300 mm in the width direction was cut out from the obtained film, and the corona-treated surface was measured in accordance with JIS-K-7100 using the following procedure, except that after aging at a temperature of 23° C. and relative humidity of 50% for 24 hours, the test atmosphere was set at 23° C. and relative humidity of 50%.

The test specimen was placed on the substrate of the hand coater, a few drops of mixed test liquid were dropped on the test specimen, and the wire bar was immediately pulled to spread the liquid. If a cotton swab or brush is used to spread the mixed test liquid, the liquid should be spread quickly over an area of 6 cm$^2$. The amount of the liquid should be controlled not to make a pool but form a thin layer.

The wet tension was determined by observing the liquid film of the mixed test liquid under a bright light, and judging from the condition of the liquid film after 3 seconds. If the liquid film maintained the condition that looked like it was just after being applied and did not break for 3 seconds or more, the sample was judged as being wet.

If the wet condition maintained for 3 seconds or more, then proceed to next mixed liquid having higher surface tension.

Conversely, if the liquid film was broken in less than 3 seconds, then proceed to next mixed liquid having lower surface tension. The process was repeated to select the mixed liquid that could wet the surface of the test specimen in exactly 3 seconds.

A new cotton swabs should be used for each test. The brush or wire bar should be washed with methanol and dried after each use, because evaporation of residual liquid might affect its composition and surface tension.

The process of selecting the mixed liquid that could wet the surface of the corona-treated surface in 3 seconds was repeated at least 3 times. The surface tension of the mixed liquid selected in the above manner was reported as the wet tension of the film.

Example 1

As a raw material, a resin composition made by mixing silica particles with irregular shape having an average particle diameter of 1.7 µm with polyethylene terephthalate (intrinsic viscosity=0.62 dl/g, Tg=78° C.) so that the particle content was 2400 ppm by weight was used for the surface layer (A), and a resin composition made by mixing silica having an average particle diameter of 1.3 µm with polyethylene terephthalate (intrinsic viscosity (IV)=0.62 dl/g, Tg=78° C.) so that the particle content was 400 ppm by weight was used for the base layer (B).

Using two melt extruders, after drying the respective raw material resins, the mixed resin for forming the surface layer (A) was melt extruded at a resin temperature of 285° C. from the first extruder, and the mixed resin for forming the base layer (B) was melt extruded at a resin temperature of 285° C. from the second extruder, which were merged and laminated in a T-die so that the laminate had a structure of the surface layer (A)/the base layer (B)/the surface layer (A) from the side that was to be in contact with a casting drum, and the thickness ratio was 1/10/1 (µm), and then discharged from a T-shaped nozzle and cooled and solidified on the casting drum having a surface temperature of 35° C. to obtain an unstretched polyethylene terephthalate sheet. At that time, a wire-shaped electrode having a diameter of 0.15 mm was used to apply electrostatic force, and the sheet was adhered to the cooling drum to obtain a three-layered unstretched film.

The obtained unstretched film was heated to 115° C., and stretched in the longitudinal direction at a total stretching ratio of 4.5 times, using three-stage stretching with the first stage at 1.24 times, the second stage at 1.4 times, and the third stage at 2.6 times.

Subsequently, the film was stretched in the width direction at a temperature of 140° C. and a stretching ratio of 4.3 times, heat fixed at 245° C., heat relaxed in the width direction by 5%, and the surface of the layer (A) that had been in contact with the chill roll was corona treated under the condition of 40 W·min/m² to obtain a biaxially oriented polyester film having a film thickness of 12 µm, which was wound so that the length in the width direction was 550 mm and the length in the longitudinal direction was 500 m.

The raw material composition and film forming conditions of the obtained film are shown in Table 1. The physical properties and evaluation results of the obtained film are shown in Table 2. The film was evaluated on the surface of the layer (A) that had been in contact with the chill roll.

Example 2

A biaxially oriented polyester film having a thickness of 12 µm was obtained in the same manner as in the Example 1, except that the silica particles were changed to silica particles with irregular shape having an average particle diameter of 1.3 µm, and the silica particle content was changed to 2000 ppm by weight. The physical properties and evaluation results are shown in Table 2.

Example 3

A biaxially oriented polyester film having a thickness of 12 µm was obtained in the same manner as in the Example 1, except that the silica particles were changed to silica particles with irregular shape having an average particle diameter of 1.3 µm, and the silica particle content was changed to 1500 ppm by weight. The physical properties and evaluation results are shown in Table 2.

Example 4

As a raw material, a resin composition made by mixing silica particles with irregular shape having an average particle diameter of 1.3 µm with polyethylene terephthalate (intrinsic viscosity=0.62 dl/g, Tg=78° C.) so that the silica particle content was 1500 ppm by weight was used for the surface layer (A), and a resin composition made by mixing silica having an average particle diameter of 1.3 µm with polyethylene terephthalate (intrinsic viscosity=0.62 dl/g, Tg=78° C.) so that the particle content was 400 ppm by weight was used for the base layer (B).

Using two melt extruders, after drying the respective raw material resins, the mixed resin for forming the surface layer (A) was melt extruded at a resin temperature of 285° C. from the first extruder, and the mixed resin for forming the base layer (B) was melt extruded at a resin temperature of 285° C. from the second extruder, which were merged and laminated in a T-die so that the laminate had a structure of the surface layer (A)/the base layer (B)/the surface layer (A) from the side that was to be in contact with a casting drum, and the thickness ratio was 1/10/1 (µm), and then discharged from a T-shaped nozzle and cooled and solidified on the casting drum to obtain an unstretched polyethylene terephthalate sheet. At that time, a wire-shaped electrode having a diameter of 0.15 mm was used to apply electrostatic force, and the sheet was adhered to the cooling drum to obtain a three-layered unstretched film.

The obtained unstretched film was heated to 115° C., and stretched in the longitudinal direction at a total stretching ratio of 4.5 times, using one-stage stretching.

Subsequently, the film was stretched in the width direction at a temperature of 140° C. and a stretching ratio of 4.5 times, heat fixed at 245° C., heat relaxed in the width direction by 5% to obtain a biaxially oriented polyester film having a thickness of 12 µm, which was wound so that the length in the width direction was 550 mm and the length in the longitudinal direction was 500 m.

The surface layer (A) used for the film evaluation was on the side that had been in contact with the chill roll.

The raw material composition and film forming conditions of the obtained film are shown in Table 1. The physical properties and evaluation results of the obtained film are shown in Table 2. The film was evaluated on the surface of the layer (A) that had been in contact with the chill roll.

Example 5

A biaxially oriented polyester film having a thickness of 12 µm was obtained in the same manner as in the Example 3, except that the silica particles were changed to silica particles with spherical shape having an average particle diameter of 1.3 µm. The physical properties and evaluation results are shown in Table 2.

Example 6

A biaxially oriented polyester film having a thickness of 12 µm was obtained in the same manner as in the Example 3, except that the silica particles were changed to silica particles with spherical shape having an average particle diameter of 1.0 µm. The physical properties and evaluation results are shown in Table 2.

Example 7

A biaxially oriented polyester film having a thickness of 12 µm was obtained in the same manner as in the Example 1, except that the silica particles were changed to silica particles with spherical shape having an average particle diameter of 1.0 µm, and the silica particle content was changed to 1200 ppm by weight. The physical properties and evaluation results are shown in Table 2.

Example 8

A biaxially oriented polyester film having a thickness of 12 µm was obtained in the same manner as in the Example 3, except that the silica particles were changed to silica particles with irregular shape having an average particle diameter of 0.8 µm.

Comparative Example 1

A biaxially oriented polyester film having a thickness of 12 µm was obtained in the same manner as in the Example 1, except that the silica particles were changed to silica particles with irregular shape having an average particle diameter of 2.7 µm, and the silica particle content was changed to 1500 ppm by weight. The physical properties and evaluation results are shown in Table 2.

Comparative Example 2

A biaxially oriented polyester film having a thickness of 12 µm was obtained in the same manner as in the Example 1, except that the silica particles were changed to silica particles with irregular shape having an average particle diameter of 2.4 µm, and the silica particle content was changed to 1500 ppm by weight. The physical properties and evaluation results are shown in Table 2.

Comparative Example 3

As a raw material, a resin composition made by mixing silica particles with irregular shape having an average particle diameter of 1.3 µm with polyethylene terephthalate (intrinsic viscosity=0.62 dl/g, Tg=78° C.) so that the content of the silica particles was 1500 ppm by weight was used for the surface layer (A), and a resin composition made by mixing silica having an average particle diameter of 1.3 µm with polyethylene terephthalate (intrinsic viscosity=0.62 dl/g, Tg=78° C.) so that the particle content was 400 ppm by weight was used for the base layer (B).

Using two melt extruders, after drying the respective raw material resins, the mixed resin for forming the surface layer (A) was melt extruded at a resin temperature of 285° C. from the first extruder, and the mixed resin for forming the base layer (B) was melt extruded at a resin temperature of 285° C. from the second extruder, which were merged and laminated in a T-die so that the laminate had a structure of the surface layer (A)/the base layer (B) the surface layer (A) from the side that was to be in contact with a chill roll, and the thickness ratio was 1/10/1 (µm), and then discharged from a T-shaped nozzle and cooled and solidified on the casting drum to obtain an unstretched polyethylene terephthalate sheet. At that time, a wire-shaped electrode having a diameter of 0.15 mm was used to apply electrostatic force, and the sheet was adhered to the cooling drum to obtain a three-layered unstretched film.

The obtained unstretched film was heated to 115° C., and stretched in the longitudinal direction at a total stretching ratio of 4.0 times, using three-stage stretching with the first stage at 1.24 times, the second stage at 1.4 times, and the third stage at 2.3 times.

Subsequently, the film was stretched in the width direction at a temperature of 105° C. and a stretching ratio of 4.0 times, heat fixed at 235° C., heat relaxed in the width direction by 5% to obtain a biaxially oriented polyester film having a film thickness of 12 µm, which was wound so that the length in the width direction was 550 mm and the length in the longitudinal direction was 500 m.

The film was evaluated on the surface layer (A) that had been in contact with the chill roll.

The raw material composition and film forming conditions of the obtained film are shown in Table 1. The physical properties and evaluation results of the obtained film are shown in Table 2. The film was evaluated on the surface layer (A) that had been in contact with the chill roll.

Comparative Example 4

A biaxially oriented polyester film having a thickness of 12 µm was obtained in the same manner as in the Example 1, except that the silica particles were changed to silica particles with irregular shape having an average particle diameter of 1.3 µm, and the silica particle content was changed to 900 ppm by weight. The physical properties and evaluation results are shown in Table 2.

Comparative Example 5

A biaxially oriented polyester film having a thickness of 12 µm was obtained in the same manner as in the Example 1, except that the silica particles were changed to silica particles with irregular shape having an average particle diameter of 1.3 µm, and the silica particle content was changed to 5000 ppm by weight. The physical properties and evaluation results are shown in Table 2.

Comparative Example 6

A biaxially oriented polyester film having a thickness of 12 µm was obtained in the same manner as in the Example 1, except that the silica particles were changed to silica particles with spherical shape having an average particle diameter of 0.5 µm, and the silica particle content was changed to 1500 ppm by weight. The physical properties and evaluation results are shown in Table 2.

The results shown in Table 2 showed that the films of the Examples 1 to 8 had the number of micro protrusions having a height of 3 nm or more, the number of micro protrusions having a height of less than 3 nm, and the arithmetic average height Sa, all of which were within the specified range, resulting in superior performance after second processing such as coating and vapor deposition thanks to fewer quality defects caused by static marks and static mark discharge traces.

The obtained film in the Comparative example 1 had the number of micro protrusions having a height of 3 nm or more within the specified range, but had smaller number of micro protrusions having a height of less than 3 nm, resulting in high friction-charged electrostatic potential and poor static mark evaluation.

Furthermore, because the arithmetic average height Sa was too large, the external haze was large and the transparency was inferior.

The obtained film in the Comparative example 2 had the number of micro protrusions having a height of 3 nm or more within the specified range, but had smaller number of micro protrusions having a height of less than 3 nm, resulting in high friction-charged electrostatic potential and poor static mark evaluation.

Furthermore, because the arithmetic average height Sa was too large, the external haze was large and the transparency was inferior.

The obtained film in the Comparative example 3 had the number of micro protrusions having a height of 3 nm or more and the arithmetic average height Sa, both of which were within the specified range, but had smaller number of micro protrusions having a height of less than 3 nm, resulting in high friction-charged electrostatic potential and poor static mark evaluation.

The obtained film in the Comparative example 4 had the number of micro protrusions having a height of 3 nm or more and the number of micro protrusions having a height of less than 3 nm, both of which were too small, resulting in high friction-charged electrostatic potential and poor static mark evaluation.

The obtained film in the Comparative example 5 had the number of micro protrusions having a height of 3 nm or more, the number of micro protrusions having a height of less than 3 nm, and the maximum height Sz, all of which were within the specified range, but had too large arithmetic average height Sa, resulting in large external haze and poor transparency.

The obtained film in the Comparative example 6 had the number of micro protrusions having a height of 3 nm or more within the specified range, but had smaller number of micro protrusions having a height of less than 3 nm, resulting in high friction-charged electrostatic potential and poor static mark evaluation.

INDUSTRIAL APPLICABILITY

The biaxially oriented polyester film of the present invention is superior in transparency, does not wrinkle easily on the film roll during film production or when the film is wound into the film roll after being slit, and can be easily unwound from the film roll, and therefore, secondary processing such as coating and vapor deposition can be easily performed on the film.

Moreover, the film has fewer quality defects caused by static marks and static mark discharge traces, resulting in superior performance after secondary processing such as coating and vapor deposition.

Accordingly, it is expected to make a significant contribution to industry since the film is useful to food packaging application, especially for films with gas barrier properties.

TABLE 1

| | | Example 1 | Example 2 | Example 3 | Example 4 | Example 5 | Example 6 | Example 7 | Example 8 |
|---|---|---|---|---|---|---|---|---|---|
| raw material for layer A | polyester resin for layer A | polyethyleneterephthalate IV = 0.62 dl/g Tg = 78° C. | same as on the left | same as on the left | same as on the left | same as on the left | same as on the left | same as on the left | same as on the left |
| | shape of silica particles | irregular | irregular | irregular | irregular | spherical | spherical | spherical | irregular |
| | weight average particle diameter of silica particles (μm) | 1.7 | 1.3 | 1.3 | 1.3 | 1.3 | 1.0 | 1.0 | 0.8 |
| | silica particle content (ppm by weight) | 2400 | 2000 | 1500 | 1500 | 1500 | 1500 | 1200 | 1500 |
| film producing process | thickness of each layer in T-die (μm) | A/B/A = 1/10/1 | same as on the left | same as on the left | same as on the left | same as on the left | same as on the left | same as on the left | same as on the left |
| | electrostatic application | wire-shaped electrode with a diameter of 0.15 mm | same as on the left | same as on the left | same as on the left | same as on the left | same as on the left | same as on the left | same as on the left |
| | chill roll cooling temperature (° C.) | 35 | 35 | 35 | 30 | 35 | 35 | 35 | 35 |
| | stretching temperature in the longitudinal direction (° C.) | 115 | 115 | 115 | 115 | 115 | 115 | 115 | 115 |
| | stretching ratio at the first stage in the longitudinal direction (times) | 1.24 | 1.24 | 1.24 | 4.5 | 1.24 | 1.24 | 1.24 | 1.24 |
| | stretching ratio at the second stage in the longitudinal direction (times) | 1.4 | 1.4 | 1.4 | none | 1.4 | 1.4 | 1.4 | 1.4 |
| | stretching ratio at the third stage in the longitudinal direction (times) | 2.6 | 2.6 | 2.6 | none | 2.6 | 2.6 | 2.6 | 2.6 |
| | stretching ratio in the longitudinal direction (times) | 4.5 | 4.5 | 4.5 | 4.5 | 4.5 | 4.5 | 4.5 | 4.5 |
| | stretching temperature in the width direction (° C.) | 140 | 140 | 140 | 140 | 140 | 140 | 140 | 140 |
| | stretching ratio in the width direction (times) | 4.3 | 4.3 | 4.3 | 4 | 4.3 | 4.3 | 4.3 | 4.3 |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | heat fixing temperature (° C.) | 245 | 245 | 245 | 245 | 245 | 245 | 245 | 245 |
|  | relax ratio in the width direction (%) | 5 | 5 | 5 | 5 | 5 | 5 | 5 | 5 |
|  | film thickness (μm) | 12 | 12 | 12 | 12 | 12 | 12 | 12 | 12 |
| film properties | number of micro protrusions having a height of less than 3 nm per $4 \times 10^{-12}$ m$^2$ | 572 | 347 | 272 | 267 | 301 | 532 | 476 | 411 |
|  | number of micro protrusions having a height of 3 nm or more per $4 \times 10^{-12}$ m$^2$ | 352 | 544 | 387 | 372 | 355 | 364 | 331 | 359 |
|  | arithmetic average height Sa (μm) | 0.021 | 0.020 | 0.018 | 0.019 | 0.019 | 0.018 | 0.015 | 0.015 |
|  | static friction coefficient | 0.37 | 0.39 | 0.40 | 0.40 | 0.42 | 0.42 | 0.42 | 0.41 |
|  | kinetic friction coefficient | 0.36 | 0.37 | 0.38 | 0.39 | 0.37 | 0.38 | 0.37 | 0.39 |
|  | maximum height Sz (μm) | 1.8 | 1.6 | 1.5 | 1.6 | 1.7 | 1.5 | 1.4 | 1.3 |
|  | external haze (%) | 1.3 | 1.3 | 1.2 | 1.2 | 0.7 | 0.7 | 0.5 | 1.0 |
|  | internal haze (%) | 1.8 | 1.6 | 1.6 | 1.7 | 1.6 | 1.5 | 1.5 | 1.5 |
|  | friction-charged electrostatic potential (V) | 109 | 112 | 282 | 294 | 246 | 103 | 153 | 251 |
|  | static mark evaluation | excellent | excellent | good | good | good | excellent | excellent | good |
|  | wet tension (mN/m) | 53 mN/m | 53 | 53 | 52 | 53 | 53 | 53 | 53 |

TABLE 2

|  |  | Comparative example 1 | Comparative example 2 | Comparative example 3 | Comparative example 4 | Comparative example 5 | Comparative example 6 |
|---|---|---|---|---|---|---|---|
| raw material for layer A | polyester resin for layer A | polyethyleneterephthalate IV = 0.62 dl/g Tg = 78° C. | same as on the left | same as on the left | same as on the left | same as on the left | same as on the left |
|  | shape of silica particles | irregular | irregular | irregular | irregular | irregular | spherical |
|  | weight average particle diameter of silica particles (μm) | 2.7 | 2.4 | 1.3 | 1.3 | 1.3 | 0.5 |
|  | silica particle content (ppm by weight) | 1500 | 1500 | 1500 | 900 | 5000 | 1500 |
| film producing | thickness of each layer in T-die (μm) | A/B/A = 1/10/1 | same as on the left | same as on the left | same as on the left | same as on the left | same as on the left |
|  | electrostatic application | wire-shaped electrode with a diameter of 0.15 mm | same as on the left | same as on the left | same as on the left | same as on the left | same as on the left |
|  | chill roll cooling temperature (° C.) | 35 | 35 | 35 | 35 | 35 | 35 |
|  | stretching temperature in the longitudinal direction (° C.) | 115 | 115 | 115 | 115 | 115 | 115 |
|  | stretching ratio at the first stage in the longitudinal direction (times) | 1.24 | 1.24 | 1.24 | 1.24 | 1.24 | 1.24 |
|  | stretching ratio at the second stage in the longitudinal direction (times) | 1.4 | 1.4 | 1.40 | 1.4 | 1.4 | 1.4 |
|  | stretching ratio at the third stage in the longitudinal direction (times) | 2.6 | 2.6 | 2.30 | 2.6 | 2.6 | 2.6 |
|  | stretching ratio in the longitudinal direction (times) | 4.5 | 4.5 | 4.0 | 4.5 | 4.5 | 4.5 |

TABLE 2-continued

|  |  | Comparative example 1 | Comparative example 2 | Comparative example 3 | Comparative example 4 | Comparative example 5 | Comparative example 6 |
|---|---|---|---|---|---|---|---|
|  | stretching temperature in the width direction (° C.) | 140 | 140 | 105 | 140 | 140 | 140 |
|  | stretching ratio in the width direction (times) | 4.3 | 4.3 | 4.0 | 4.3 | 4.3 | 4.3 |
|  | heat fixing temperature (° C.) | 245 | 245 | 235 | 245 | 245 | 245 |
|  | relax ratio in the width direction (%) | 5 | 5 | 5 | 5 | 5 | 5 |
|  | film thickness (μm) | 12 | 12 | 12 | 12 | 12 | 12 |
| film proprties | number of micro protrusions having a height of less than 3 nm per $4 \times 100^{-12}$ m$^2$ | 71 | 141 | 218 | 197 | 402 | 216 |
|  | number of micro protrusions having a height of 3 nm or more per $4 \times 10^{-12}$ m$^2$ | 313 | 321 | 308 | 282 | 598 | 321 |
|  | arithmetic average height Sa (μm) | 0.030 | 0.026 | 0.018 | 0.016 | 0.031 | 0.008 |
|  | static friction coefficient | 0.39 | 0.39 | 0.40 | 0.42 | 0.37 | 0.45 |
|  | kinetic friction coefficient | 0.36 | 0.37 | 0.39 | 0.40 | 0.36 | 0.40 |
|  | maximum height Sz (μm) | 2.3 | 1.7 | 1.5 | 1.4 | 1.8 | 0.2 |
|  | external haze (%) | 2.0 | 1.9 | 1.3 | 1.1 | 2.3 | 1.1 |
|  | internal haze (%) | 0.7 | 0.6 | 1.5 | 1.5 | 2.3 | 1.1 |
|  | friction-charged electrostatic potential (V) | 1356 | 792 | 691 | 742 | 97 | 1360 |
|  | static mark evaluation | bad | bad | bad | bad | excellent | bad |
|  | wet tension (mN/m) | 54 | 53 | 52 | 53 | 53 | 51 |

The invention claimed is:

1. A biaxially oriented polyester film consisting of a polyester resin composition including particles, wherein at least one surface of the film satisfies all of the following requirements (1) to (3):
    (1) the number of micro protrusions having a height of less than 3 nm per an area of $4 \times 10^{-12}$ m$^2$ is 250 or more and 600 or less;
    (2) the number of micro protrusions having a height of 3 nm or more per an area of $4 \times 10^{-12}$ m$^2$ is 331 or more and 600 or less; and
    (3) an arithmetic average height Sa of 0.010 μm or more and 0.025 μm or less.

2. The biaxially oriented polyester film according to claim 1, wherein a kinetic friction coefficient between a surface satisfying all of the requirements (1) to (3) and the opposite surface is 0.20 or more and 0.60 or less.

3. The biaxially oriented polyester film according to claim 1, wherein a surface satisfying all of the requirements (1) to (3) has a wet tension of 50 mN/m or more.

4. The biaxially oriented polyester film according to claim 1, having an external haze of 1.8% or less and an internal haze of 2% or less.

5. The biaxially oriented polyester film according to claim 1, having a thickness of 5 μm or more and 40 μm or less.

6. The biaxially oriented polyester film according to claim 1, wherein the particles in the polyester resin composition have a content of 1000 ppm by weight or more and 3000 ppm by weight or less.

* * * * *